United States Patent [19]
Fujiki

[11] Patent Number: 5,627,449
[45] Date of Patent: May 6, 1997

[54] ELECTRONIC DEVICE, BATTERY PACK AND CHARGER FOR THE BATTERY PACK

[75] Inventor: Shiro Fujiki, Tokyo, Japan

[73] Assignee: Yaesu Musen Co., Ltd., Tokyo, Japan

[21] Appl. No.: 291,858

[22] Filed: Aug. 17, 1994

[30] Foreign Application Priority Data

Aug. 30, 1993 [JP] Japan .................... 5-214207

[51] Int. Cl.$^6$ ........................................ H02J 7/00
[52] U.S. Cl. ........................ 320/5; 320/14; 320/15
[58] Field of Search .................. 320/5, 13, 14, 320/15, 6; 429/90, 91, 92

[56] References Cited

U.S. PATENT DOCUMENTS

| | | |
|---|---|---|
| 5,159,258 | 10/1992 | Kolvites et al. . |
| 5,164,652 | 11/1992 | Johnson et al. . |
| 5,206,097 | 4/1993 | Burns et al. ............... 429/90 |
| 5,218,287 | 6/1993 | Chen . |
| 5,460,901 | 10/1995 | Syrjälä ..................... 429/90 |

FOREIGN PATENT DOCUMENTS

| | | |
|---|---|---|
| 0394074 | 10/1990 | European Pat. Off. . |
| 394074 | 10/1990 | European Pat. Off. . |
| 0514072 | 11/1992 | European Pat. Off. . |
| 415072 | 11/1992 | European Pat. Off. . |
| 53-129905 | 3/1952 | Japan . |
| 61-202132 | 12/1986 | Japan . |
| 5-137273 | 11/1991 | Japan . |
| 5-168149 | 12/1991 | Japan . |
| 4-10957 | 1/1992 | Japan . |
| 5-198293 | 8/1993 | Japan . |
| 5-218942 | 8/1993 | Japan . |
| 5-266867 | 10/1993 | Japan . |
| 2237941 | 5/1991 | United Kingdom . |
| 2239567 | 7/1991 | United Kingdom . |
| 2242083 | 9/1991 | United Kingdom . |
| 2262401 | 6/1993 | United Kingdom . |

OTHER PUBLICATIONS

"Battery Type Indicator," *IBM Technical Disclosure Bulletin*, vol. 35, No. 4A, Sep. 1992, Armonk, NY, pp. 449–450.
Patent Abstracts of Japan, vol. 18, No. 205, for JP6006938 published Jan. 14, 1994 Abstract Publ Date Apr. 12, 1994.
Patent Abstracts of Japan, vol. 17, No. 661 for JP5218942 published Aug. 27, 1993 Abstract Publ Date Dec. 7, 1993.
Patent Abstracts of Japan vol. 15, No. 98, for JP2307336 published Dec. 20, 1990 Abstract Publ Date Mar. 8, 1991.
IBM Technical Disclosure Bulletin, vol. 35, No. 4A, Sep. 1992, pp. 449–450.

*Primary Examiner*—Peter S. Wong
*Assistant Examiner*—Patrick B. Law
*Attorney, Agent, or Firm*—Law Office of Steven M. Rabin, P.C.

[57] ABSTRACT

An electronic device (21) switches its operation mode in accordance with the type of an installed battery pack (22). The battery pack (22) has a regulator (222), a specification-discriminating terminal (TJ), and a resistor (224), connected between the regulator (222) and the specification-discriminating terminal (TJ) and having a resistance corresponding to the specification of the incorporated battery (221). The electronic device (21) has a monitor resistor (214) connected between a terminal (TL) connected to the specification-discriminating terminal (TJ) of the battery pack (22) and ground, a discriminating circuit (212, 215, 216) for detecting a monitor voltage generated across this monitor resistor (214) to discriminate the specification of the battery (221), and a switch controller (212, 219) for switching the operation mode in accordance with the specification discriminated by the discriminating circuit (212, 215, 216).

23 Claims, 6 Drawing Sheets

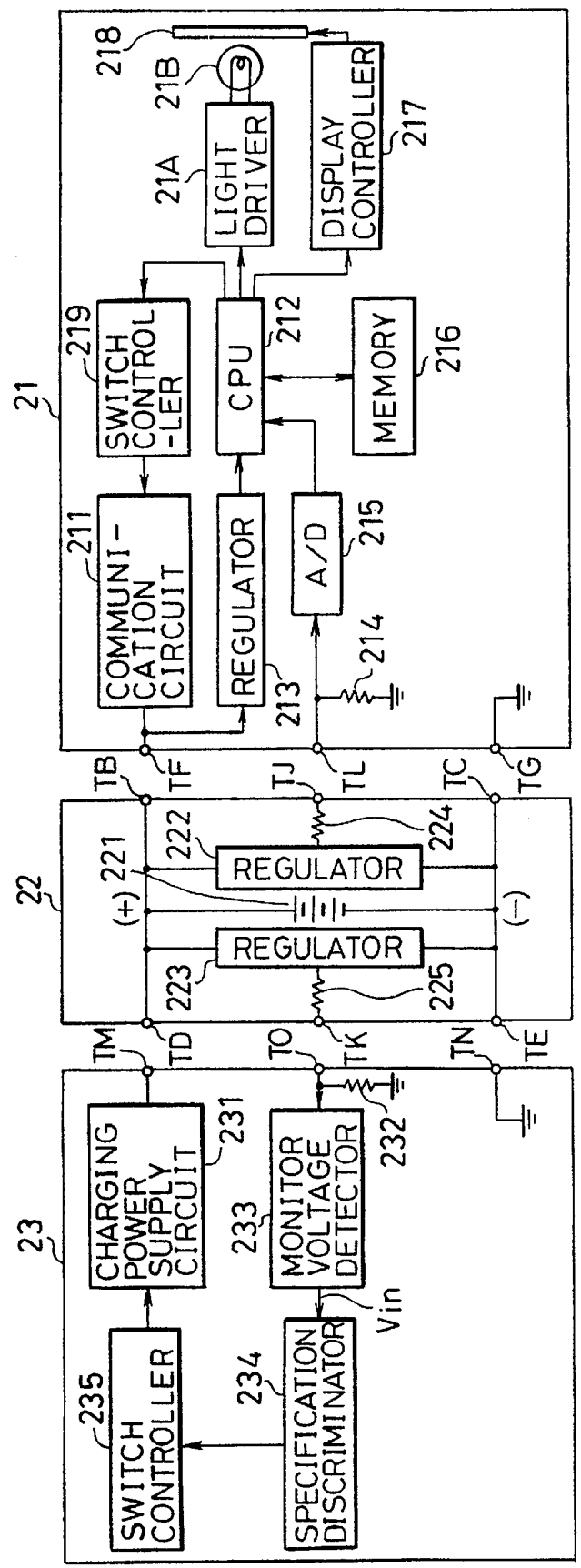
F I G. 1

ELECTRONIC DEVICE, BATTERY PACK AND CHARGER FOR THE BATTERY PACK

BACKGROUND OF THE INVENTION

1. Field of the Invention

The present invention relates to an electronic device which uses a detachable battery pack as its power supply, such as a portable radio communication apparatus, a battery pack, a charger for the battery pack and their peripheral devices.

2. Description of the Related Art

A portable radio communication apparatus uses a detachable battery pack as a power supply. Plural types of battery packs are available for such a portable radio communication apparatus in view of the portability and power-supply efficiency of the equipment. Each battery pack incorporates one of several different specifications of batteries (voltage or current capacities). The batteries include a nickel-cadmium battery, an alkaline battery, and a manganese battery. Generally, the nickel-cadmium battery which is rechargeable is used.

Portable radio communication apparatus has several usage modes, a standard usage mode, prolonged usage mode, high-power usage mode and prolonged high-power usage mode. A battery pack for the standard use incorporates a standard battery, a battery pack for the prolonged use incorporates a battery which has a large capacity, a battery pack for the high-power use incorporates a battery which outputs a high voltage, and a battery pack for prolonged high-power use incorporates a battery which has a large capacity and outputs a high voltage.

A portable radio communication apparatus which uses a battery pack has a function of automatically discriminating the type of the battery incorporated in the installed battery pack and switching the operation mode (operation parameter) to the one that matches with the battery type.

When the battery in the battery pack is a rechargeable type, it is necessary to select a charging power supply appropriate for the battery type to charge the rechargeable battery. A conventional charger for battery packs therefore has a plurality of charging power supply circuits, automatically discriminates the type of installed battery pack and selects the charging power supply circuit that matches with the battery pack to charge the incorporated battery.

FIG. 6 shows the structures of a portable radio communication apparatus, battery packs and a charger for the battery packs, according to the prior art.

In FIG. 6, battery packs 121, 122 and 123 respectively incorporate rechargeable batteries A1, A2 and A3 of different specifications (rated: current capacities/output voltages/charging voltages), and each has output terminals TB1, TB2, TB3 and TC and charging input terminals TD1, TD2, TD3 and TE.

The positive electrode of the battery A1 in the first battery pack 121 is connected to the terminals TB1 and TD1. The positive electrode of the battery A2 in the second battery pack 122 is connected to the terminals TB2 and TD2. The positive electrode of the battery A3 in the third battery pack 123 is connected to the terminals TB3 and TD3. The negative electrodes of the batteries A1 to A3 in the battery packs 121 to 123 are all connected to the terminals TC and TE.

A communication apparatus body 11 has power supply terminals TF1, TF2, TF3 and TG, which are respectively connected to the terminals TB1, TB2, TB3 and TC of each of the battery packs 121 to 123.

A terminal voltage detector 113 detects which terminal, TF1, TF2 or TF3, is connected to the battery in the battery pack 121, 122 or 123 from the voltage levels at the terminals TF1, TF2 and TF3, and discriminates the connected battery pack (its specification). In accordance with the discrimination of the terminal voltage detector 113, an operation mode switching controller 114 switches the operation mode of a communication circuit 112 to the mode associated with the installed battery pack.

A charger 13 has terminals TH1, TH2, TH3 and TI, which are connected to the terminals TD1, TD2, TD3 and TE of any of the battery packs 121–123, and includes a charging power supply circuit 131 for outputting charge voltages to the power supply terminals TH1, TH2 and TH3 to charge the batteries A1, A2 and A3 respectively.

When the battery pack 121, 122 or 123 is attached to the charger 13, the incorporated battery A1, A2 or A3 is charged with the voltage appropriate for this battery, through the terminal TD1, TD2 or TD3 connected to the battery.

According to the structure shown in FIG. 6, as the types of battery packs increase, the number of terminals provided on the communication apparatus body 11, the battery packs 121–123 and the charger 13 should also be increased. That is, as the types of battery packs increase, the number of terminals inevitably increases, which does not meet the demand on a portable electronic device for compactness and lighter weight.

U.S. Pat. No. 5,164,652 discloses a system which discriminates the type of an installed battery pack and can overcome this problem. The contents of this patent are incorporated herein by reference.

According to the technique disclosed in the patent, as shown in FIG. 7 of this application, when a battery (battery pack) 1 is attached to a battery driver (radio transceiver) 2, their associated power supply terminals 3, ground terminals 4 and detection terminals 5 are connected together. The detection terminal 5 of the battery driver 2 is connected via a resistor 6 to the supply voltage while the detection terminal 5 of the battery 1 is grounded via a resistor 7 whose resistance is specific to the battery type and differs from those of different types of batteries.

Therefore, the voltage at the detection terminal 5 changes in accordance with the type of the battery 1 attached to the battery driver 2. A battery-type detector 8 detects the voltage at the detection terminal 5, compares the detected value with a predetermined reference level (for discrimination of the battery type) to discriminate the type of the connected battery 1. A switch controller 9 switches the operation mode of a communication circuit based on the result of the discrimination by the battery-type detector 8.

According to the technique taught in the patent, the battery-type detector 8 provides the reference level for the discrimination of the battery type. If there are many types of batteries 1, therefore, it is necessary to alter the hardware of the battery-type detector 8.

When the voltage in the battery pack 1 becomes unstable (low), the voltage applied to the pull-up resistor 6 falls below the proper value, the voltage at the detection terminal 5 is not specifically determined in accordance with the type of the installed battery pack, so that the battery-type detector 8 may erroneously discriminate the type of the installed battery pack 1.

Further, the charger for charging the battery 1 having the structure shown in FIG. 7 cannot charge the batteries A1, A2 and A3 in the conventional battery packs 121, 122 and 123 shown in FIG. 6. Furthermore, the battery pack 1 with the structure shown in FIG. 7 cannot supply power to the communication apparatus body 11 shown in FIG. 6.

SUMMARY OF THE INVENTION

It is therefore an object of the present invention to provide an electronic device and a charger, which can discriminate the type of an installed battery pack without requiring the alteration of hardware even if the types of installable battery packs increase in the future.

It is another object of this invention to provide an electronic device which can surely discriminate the type of an installed battery pack with a simple structure.

It is a further object of this invention to provide a charger and its attachment capable of charging battery packs of different structures, and an attachment which allows a power supply to be provided an electronic device from battery packs of different structures.

To achieve the above objects, according to this invention, there is provided an electronic device having terminals connected to those of any of a plurality of battery packs of different specifications when selectively attached to a main body of the electronic device, thereby allowing discharge of a battery incorporated in the attached battery pack as a supply voltage to the main body of the electronic device, and switching an operation mode in accordance with a type of the attached battery pack, the electronic device and each of the battery packs having specification-discriminating terminals which are connected when the electronic device and battery pack are connected together;

each of the battery packs having specification-discriminating voltage generating means for generating a specification-discriminating voltage indicating the specification of the incorporated battery from an output voltage of the incorporated battery, and outputting the specification-discriminating voltage to the specification-discriminating terminal; and the main body has a monitor resistor connected between the specification-discriminating terminal and ground, monitor voltage detecting means for detecting a monitor voltage generated across the monitor resistor, specification discriminating means for discriminating the specification of the incorporated battery of the attached battery pack from the monitor voltage detected by the monitor voltage detecting means, and operation mode switching means for switching the operation mode in accordance with the specification discriminated by the specification discriminating means.

BRIEF DESCRIPTION OF THE DRAWINGS

FIG. 1 is a block diagram illustrating the structures of a portable radio communication apparatus, a battery pack and a charger therefore, according to one embodiment of the present invention;

DETAILED DESCRIPTION OF TEE PREFERRED EMBODIMENT

Figure 2:
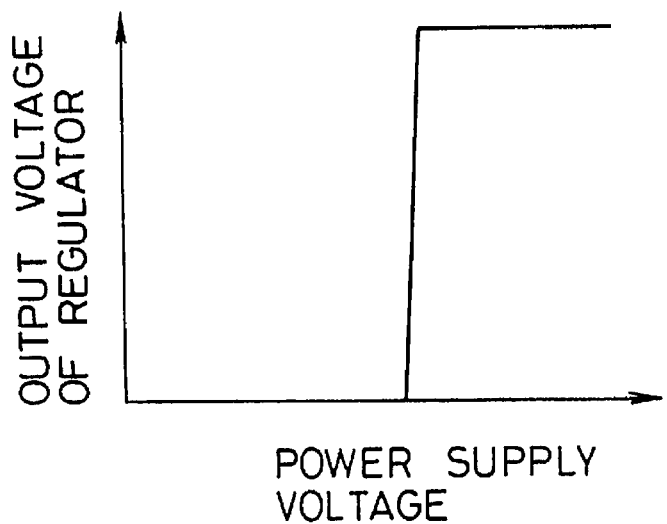
FIG. 2 is a diagram showing the relationship between a power supply voltage supplied to a regulator and the output voltage of the regulator.

One embodiment of the present invention will now be described in detail with reference to FIGS. 1 and 2.

FIG. 1 shows the structures of a main body 21 of a portable radio communication apparatus, a battery pack 22 and a charger 23 for the battery pack 22, according to this invention.

There are four types of battery packs 22, BP1 to BP4, available in accordance with the usage mode of the communication apparatus.

The battery pack 22 incorporates a rechargeable battery 221. The battery 221 has a positive electrode connected to terminals TB and TD and a negative electrode connected to terminals TC and TE. The output voltage of the battery 221 is supplied to first and second regulators 222 and 223, which produce predetermined reference voltages from the output voltage of the battery 221. As shown in FIG. 2, the regulators 222 and 223 of a type which do not function when the output of the battery 221 falls below the rated output voltage by a predetermined level, e.g., 5%.

The output voltages of the regulators 22 and 223 are supplied to terminals TJ and TK via resistors 224 and 225, respectively. The resistances of the resistors 224 and 225 are set in accordance with the type of the incorporated battery.

Table 1 below shows one example of the combinations of the types (BP1–BP4) of the battery packs 22 and the resistance of the resistor 224. The battery packs BP1 to BP4 are respectively for the standard use, the prolonged communication, the long-distance communication and prolonged long-distance communication. An external power supply pack shown in Table 1 will be discussed later.

TABLE 1

| Battery Pack | Output Voltage | Capacity | Resistor 224 |
|---|---|---|---|
| BP1 | 4.8 V | 600 mAh | 15 KΩ |
| BP2 | 7.2 V | 600 mAh | 33 KΩ |
| BP3 | 4.8 V | 1200 mAh | 10 KΩ |
| BP4 | 7.2 V | 900 mAh | 22 KΩ |
| external power supply pack | | | 5 KΩ |

The communication apparatus body 21 terminals TF, TG and TL which are connected to the TB, TC and TJ of the battery pack 22 when installed in this body 21. The output voltage of the battery 221 is supplied via the terminals TB and TF to a communication circuit 211 and a regulator 213 as a supply voltage for a CPU 212, etc.

The terminal TL is grounded via a monitor resistor 214. The output voltage of the regulator 222 in the battery pack 22 is divided by the resistors 224 and 214, and the resultant voltage is supplied to an A/D (Analog/Digital) converter 215.

The A/D converter 15 converts the supplied voltage (monitor voltage) into a digital value and supplied to the digital voltage to the CPU 212.

A memory 216, which may be a ROM, stores reference values for discriminating the type (specification) of the battery pack 22.

The CPU 212 compares the digital voltage value supplied from the A/D converter 215 with the reference values stored in the memory 216 to discriminate the type of the installed battery pack 22. The CPU 212 causes a display controller 217 to display the discriminated type of the battery pack 22 on a display 218 and causes a switch controller 219 to switch the usage mode (operation mode; operation parameter) of the communication circuit 211.

Supposing that the output voltage of the regulator 222 of the battery pack 22 is 3 V, the resistance of the resistor 224 takes values given in Table 1, and the monitor resistor 214 has a resistance of 15 KΩ, then the memory 216 stores the following discrimination reference values.

TABLE 2

| Connected Battery | Lower Limit < Voltage Value < Upper Limit |
|---|---|
| BP1 | 1.43 < V < 1.58 |
| BP2 | 2.00 < V < 2.12 |
| BP3 | 1.13 < V < 1.24 |
| BP4 | 1.71 < V < 1.85 |
| external power supply pack | 2.18 < V < 2.35 |

When the standard-operation battery pack 22 (=BP1) is installed in the communication equipment body 21, for example, since the resistances of the resistors 224 and 214 are both 15 KΩ, 1.5 V is supplied to the A/D converter 215. The A/D converter 215 converts this voltage value into a digital value. The CPU 212 detects that the voltage value "1.5" is greater than the reference value 1.43 but smaller than the reference value 1.58, both stored in the memory 216, and discriminates that the connected battery pack is BP1 or the battery pack for the standard operation. The CPU 212 then displays the operation mode on the display 218 via the display controller 217. In accordance with the discrimination by the CPU 212, the switch controller 219 switches the operation mode of the communication circuit 211 to the normal mode.

With the above-described structure, when the types (specifications) of installable battery packs 22 increase, a new battery pack 22 can be discriminated without altering the hardware structure of the communication equipment body 21 by simply setting the resistance of the resistor 224 of the new battery pack 22 properly and changing the stored data in the memory 216 in the communication equipment body 21 properly. This design permits the types of battery packs to be easily increased. Because the regulator 222 is of a type whose output voltage sharply drops when the output of the battery 221 falls below the rated voltage by a given ratio as shown in FIG. 2, the input voltage of the A/D converter 215 does not become unstable and the communication apparatus body 21, thus preventing the communication apparatus body 21 from erroneously discriminating the type of the installed battery pack 22.

A description will now be given of the structure of the charger 23 for charging the battery pack 22 with the above-described structure.

The charger 23 has a charging power supply circuit 231 capable of outputting different voltages, a terminal TM to which the output voltage of the charging power supply circuit 231 is supplied, a terminal TO, a monitor resistor 232 connected between the terminal TO and the ground, a monitor voltage detector 233 for detecting a voltage at a terminal TK (monitor voltage), a specification discriminator 234 for discriminating the type of the battery pack 22 from the voltage Vin detected by the monitor voltage detector 233, a switch controller 235 for switching the output voltage of the charging power supply circuit 231, and a terminal TN grounded.

When the battery pack 22 is attached to the socket portion of the charger 23, the terminals TM, TN and TO of the charger 23 are connected to the terminals TD, TE and TK of the battery pack 22, respectively.

As a result, the output voltage of the charging power supply circuit 231 is applied across the regulator 223 via the terminals TM and TD, causing the regulator 223 to output a predetermined reference voltage. The output voltage of the regulator 223 is applied across the monitor resistor 232 via the resistor 225 having a resistance determined according to the type of the battery pack 22, and via the terminals TK and TO. Accordingly, the output voltage of the regulator 223 divided by the resistors 225 and 232, i.e., the voltage according to the type of the battery pack 22, is applied to the monitor voltage detector 233.

The monitor voltage detector 233 discriminates the value of the supplied voltage, and supplies the detected voltage value Vin to the specification discriminator 234. The specification discriminator 234 has a table showing the correlation between the detected voltage Vin and the type of each battery pack 22, and discriminates the type of the installed battery pack 22 by referring to the table.

The discrimination result is sent to the switch controller 235. In accordance with the discriminated type, the switch controller 235 properly select the parameter of the charging power supply circuit 231 to apply the proper charge voltage to the battery 221.

Table 3 below shows reference values when the resistor 225 and the resistor 224 of each battery pack 22 have the same resistance, the resistance of the monitor resistor 232 is set to 15 KΩ and the output voltage of the regulator 223 is set to 3 V.

TABLE 3

| Charge Selection Reference | |
|---|---|
| Connected Battery | Vin |
| with BP1 connected | 1.43 < Vin < 1.58 |
| with BP2 connected | 2.00 < Vin < 2.12 |
| with BP3 connected | 1.13 < Vin < 1.24 |
| with BP4 connected | 1.71 < Vin < 1.85 |

When the battery pack BP1 is connected to the charger 23, for example, since the output voltage of the regulator 223 is 3 V and the resistances of the resistors 232 and 225 are both 15 KΩ, the monitor voltage Vin becomes 1.5 V, which lies in a range between 1.43 and 1.58. Therefore, the specification discriminator 234 discriminates the connected battery pack 22 is BP1. The discrimination result is sent to the switch controller 235, which in turn switches the output voltage of the charging power supply circuit 231 to the voltage for BP1.

The charger 23 with the above structure can discriminate the type of a new battery pack 22 and can switch the charge voltage to the one corresponding to this type by simply rewriting the reference values for discrimination stored in the specification discriminator 234, without increasing the number of terminals, even if the types of the battery packs 22 increase. Even if the output voltage of the battery 221 is insufficient, the regulator 223 produces the proper reference voltage from the output voltage of the charging power supply circuit, so that the charger 23 can surely discriminate the type of the attached battery pack 22.

Figure 3:
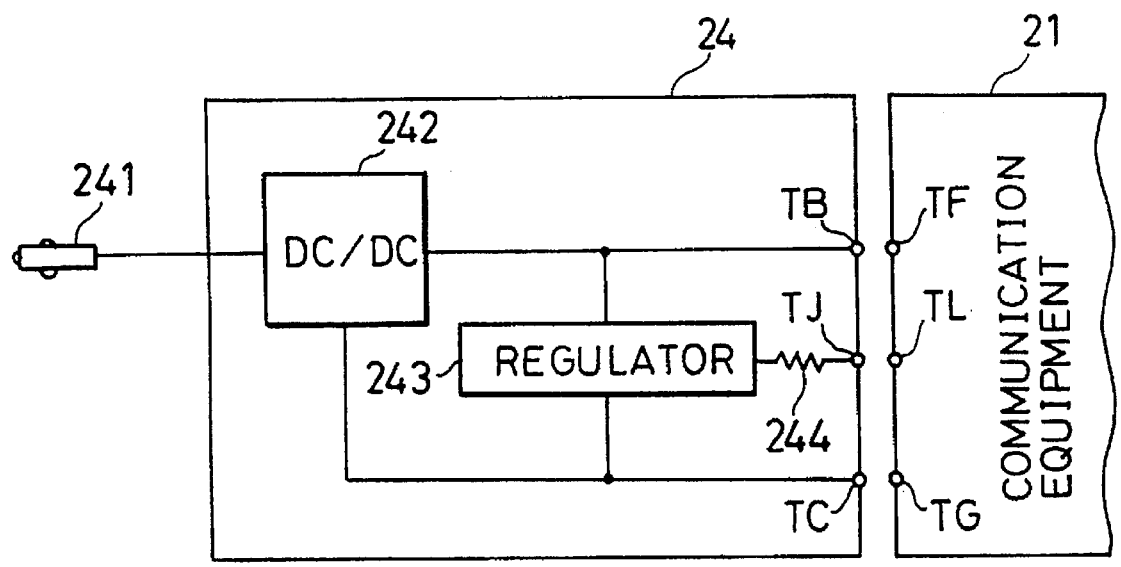
FIG. 3 is a block diagram showing the structure of one example of an external power supply pack.

An external power supply pack 24 connectable to the communication apparatus body 21 will be described below referring to FIG. 3.

The external power supply pack 24 supplies power to the communication equipment body from, for example, a battery mounted in a vehicle or the like. The external power supply pack 24 has a plug 241 to connect to, for example, the battery mounted in vehicle, a DC/DC converter 242 for converting a DC voltage, supplied through the plug 241, to a predetermined voltage, and terminals TB, TC and TJ.

The DC/DC converter 242 has a positive electrode connected to the terminal TB and a negative electrode connected to the terminal TC. The output voltage of the DC/DC converter 242 is supplied to a regulator 243, which produces a predetermined voltage from the output of the DC/DC converter 242. The output voltage of the regulator 243 is supplied via a resistor 244 to the terminal TJ. The specification-discriminating resistor 244 has a resistance (5 KΩ in Table 1) that indicates the voltage is from the external power supply.

When the external power supply pack 24 is attached to the communication equipment body 21, the terminals TB, TJ and TC are connected to the terminals TF, TL and TG and the output voltage of the DC/DC converter 242 is supplied via the terminals TB and TF to the communication equipment body 21. The reference voltage from the regulator 243 in the external power supply pack 24 is divided by the resistor 244 and the monitor resistor 214 and the resultant voltage is supplied to the A/D converter 215. The A/D converter 215 performs A/D conversion on the received voltage and supplies the digital voltage to the CPU 212. The CPU 212 compares the output data of the A/D converter 215 with the reference values (Table 1) stored in the memory 216 and discriminates that the connected power supply is the external power supply pack 24. The CPU 212 then causes the switch controller 219 to switch the operation mode of the communication circuit 211 to the corresponding mode.

When the connected power supply is the external power supply pack 24, the consumed power of the communication apparatus body 21 need not be saved. Therefore, the CPU 212 sends an instruction signal to a light driver 21A to always turn on a back-light 21B of the display 218. This facilitates the viewing of the display contents on the display 218 even in dark. When the battery pack 22 is connected to the communication apparatus body 21, it is convenient if the back-light 21B is lit only for a given period of time by operating an unillustrated light switch.

Figure 4:
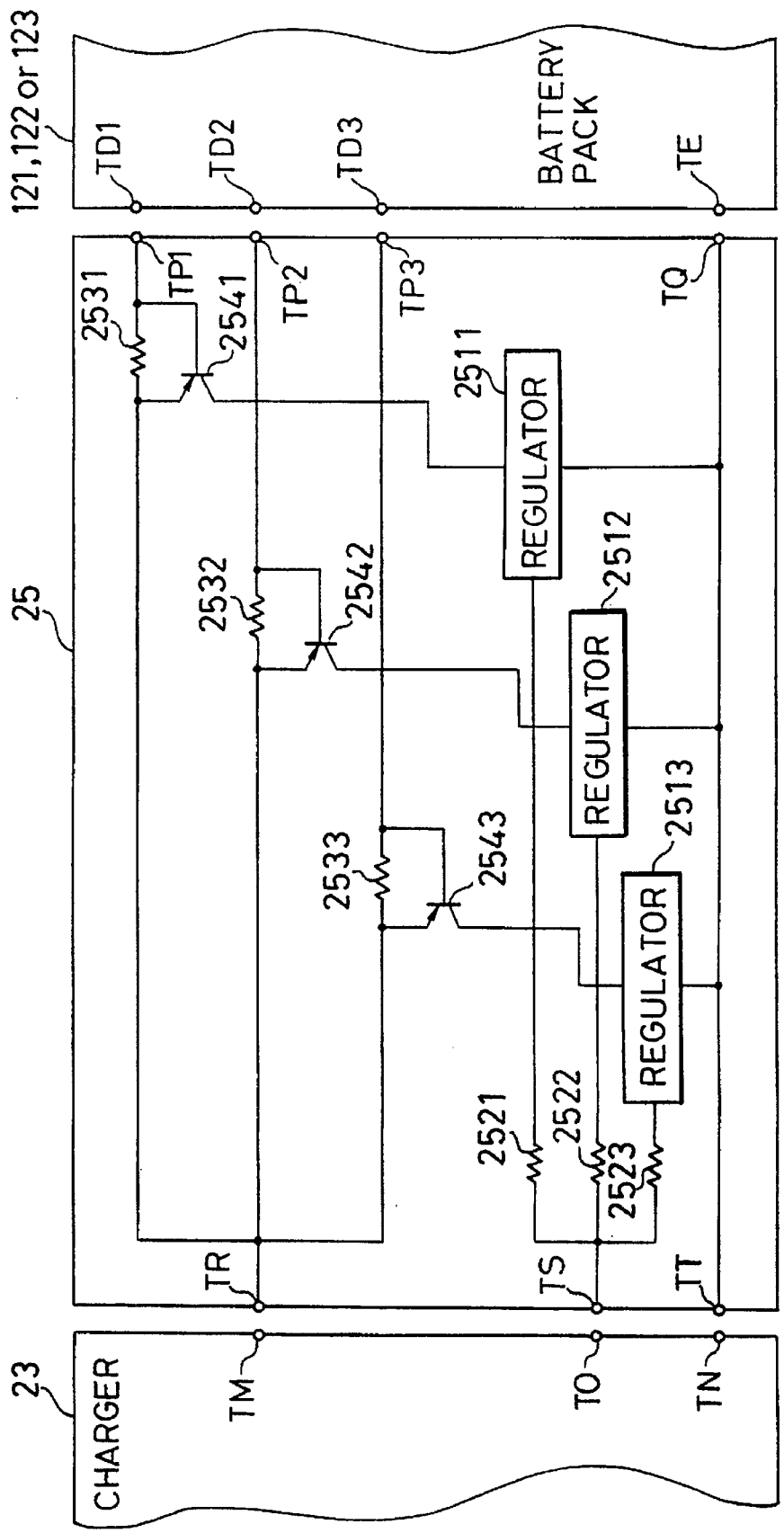
FIG. 4 is a diagram showing the structure of an attachment according to one embodiment which is used for the charger embodying this invention.
Figure 5:
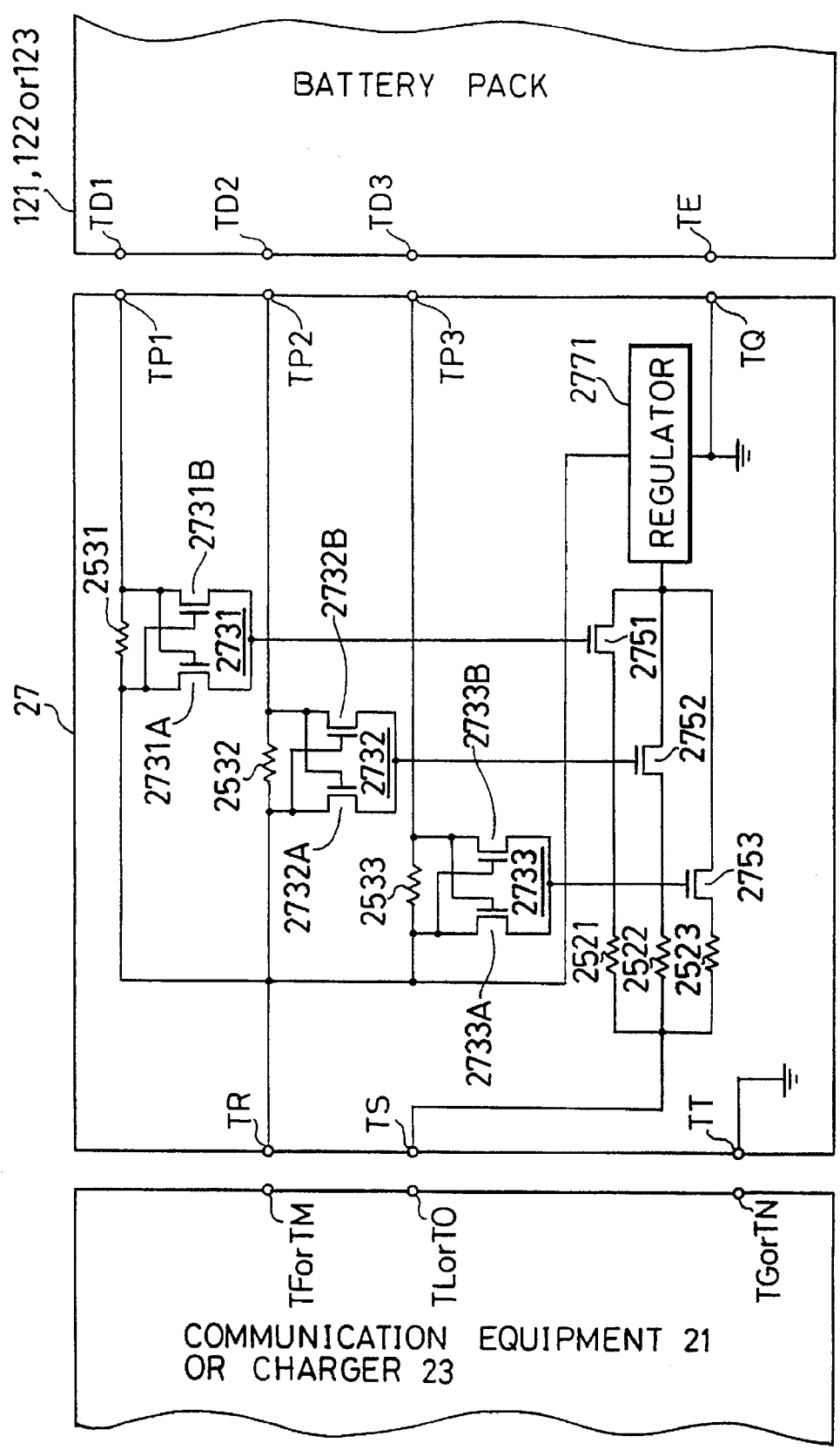
FIG. 5 is a diagram showing the structure of a modification of the attachment shown in FIG. 4.
Figure 6:
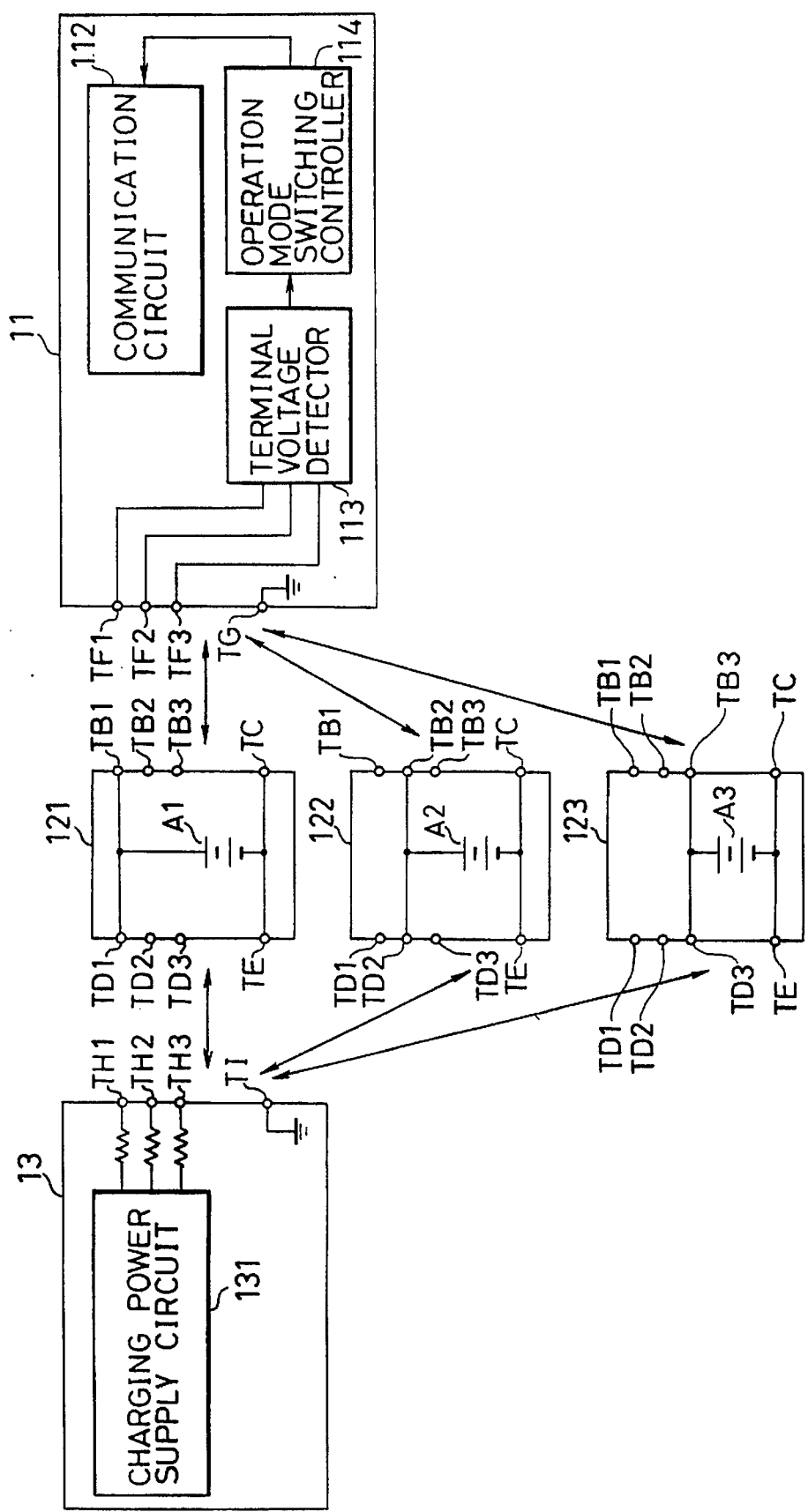
FIG. 6 is a block diagram illustrating the structures of a portable radio communication apparatus, battery packs and a charger therefore, according to prior art.
Figure 7:
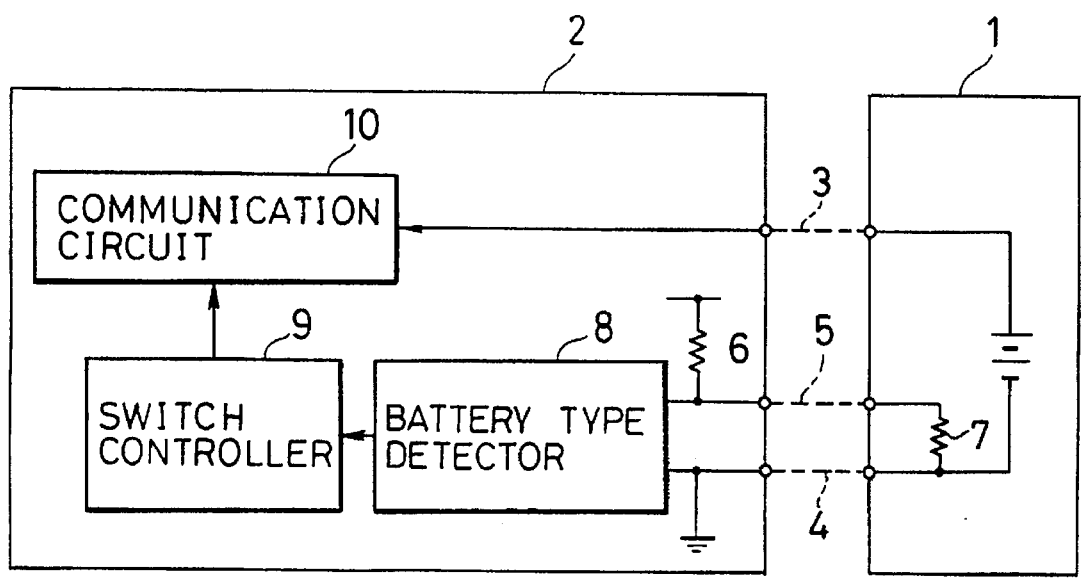
FIG. 7 is a block diagram illustrating the other prior art structures of a portable radio communication apparatus and a battery pack.

With reference to FIGS. 4 and 5, a description will now be given of the structure of an attachment which allows the charger 23 in FIG. 1 to charge any of the battery packs 121–123 in FIG. 6 and the structure of an attachment which allows the power supply to the communication equipment body 21 in FIG. 1 from any of the battery packs 121–123 in FIG. 6.

First, the attachment which allows the charger 23 to charge any of the battery packs 121–123 in FIG. 6 will be discussed with reference to FIG. 4.

An attachment 25 has terminals TP1, TP2, TP3 and TQ, which are connected to the terminals TD1, TD2, TD3 and TE of any of the battery packs 121–123 when attached thereto, and terminals TR, TS and TT which are connected to the terminals TM, TO and TN of the charger 23 when attached thereto.

The individual terminals TP1 to TP3 are respectively connected to one ends of resistors 2531, 2532 and 2533 and the bases of PNP transistors 2541, 2542 and 2543. The other ends of the resistors 2531, 2532 and 2533 and the emitters of the PNP transistors 2541, 2542 and 2543 are connected to the terminal TR.

The collectors of the transistors 2541, 2542 and 2543 are respectively connected to the power terminals of regulators 2511, 2512 and 2513 whose ground terminals are grounded.

The regulators 2511, 2512 and 2513 produce predetermined reference voltages and supply those voltages to the terminal TS via associated resistors 2521, 2522 and 2523. The resistors 2521 to 2523 have resistances corresponding to the specifications of the batteries connected to the terminals TP1 to TP3. The terminal TT is connected to the ground terminal TN of the charger 23.

When the attachment 25 is connected between the battery pack 121 (FIG. 6) and the socket of the charger 23, for example, the terminals TD1, TD2, TD3 and TE of the battery pack 121 are respectively connected to the terminals TP1, TP2, TP3 and TQ of the attachment 25, and the terminals TM, TO and TN of the charger 23 are respectively connected to the terminals TR, TS and TT of the attachment 25.

A current flows into the battery A1 of the battery pack 121 via the terminals TM and TR, the resistor 2531 and the terminals TP1 and TD1 from the charging power supply circuit 231, causing a voltage drop across the resistor 2531. This voltage drop turns the transistor 2541 on, enabling the regulator 2511.

The terminals TP2 and TP3 are open-circuited, causing no voltage drop across the resistors 2532 and 2533. As a result, the transistors 2542 and 2543 are kept off and the regulators 2512 and 2513 are kept disabled.

The output voltage of the regulator 2511 is applied to the monitor resistor 232 of the charger 23 via the resistor 2521 that has the resistance corresponding to the specification of the battery A1. Therefore, the monitor voltage obtained by dividing the output voltage of the regulator 2511 by the resistor 2521 and the monitor resistor 232 is applied to the monitor voltage detector 233. The monitor voltage detector 233 detects the supplied voltage and supplies the detected voltage value Vin to the specification discriminator 234. The specification discriminator 234 compares the supplied voltage value Vin with the reference values set previously, discriminates that the connected battery pack is the battery pack 121, and sends data indicating the discrimination result to the switch controller 235. The switch controller 235 switches the output voltage of the charging power supply circuit 231 to the one suitable for the battery pack 121 (battery A1). Thereafter, charging is performed with the voltage that matches with the battery pack 121.

When the battery pack 122 is connected via the attachment 25 to the charger 23, a voltage drop occurs across the resistor 2532. This turns on the transistor 2542 on and enables the regulator 2512. The output voltage of the regulator 2512 is divided by the resistor 2522 and the monitor resistor 232, and the resultant voltage is supplied to the monitor voltage detector 233. The monitor voltage detector 233 detects the value of the supplied voltage and supplies the detected voltage value to the specification discriminator 234. Based on the supplied voltage, the specification discriminator 234 detects that the connected battery pack is the battery pack 122, and the switch controller 235 switches the output voltage of the charging power supply circuit 231 to the one suitable for the battery pack 122 (battery A2). Therefore, the battery A2 is charged with the appropriate voltage.

When the battery pack 123 is connected via the attachment 25 to the charger 23, a voltage drop occurs across the resistor 2533. This turns on the transistor 2543 on and enables the regulator 2513. The output voltage of the regulator 2513 is divided by the resistor 2523 and the monitor resistor 232, and the resultant voltage is supplied to the monitor voltage detector 233. The monitor voltage detector 233 detects the value of the supplied voltage and supplies the detected voltage value to the specification discriminator 234. Based on the supplied voltage, the specification discriminator 234 detects that the connected battery pack is the battery pack 123, and the switch controller 235 switches the output voltage of the charging power supply circuit 231 to the one suitable for the battery pack 123 (battery A3). Therefore, the battery A3 is charged with the appropriate voltage.

Therefore, the use of the attachment 25 allows the charger 23 in FIG. 1 to charge the conventional battery packs 121-123.

The individual transistors constituting the attachment 25 may be replaced with other switch circuits, such as NPN bipolar transistors, MOS transistors, and relays. While the three regulators 2511, 2512 and 2513 are provided in the structure in FIG. 4, a switch circuit which is set on or off in accordance with the ON/OFF actions of the transistors 2541, 2542 and 2543 may be provided to selectively connect one of the resistors 2521, 2522 and 2523 to one regulator.

A modification of the attachment shown in FIG. 4 is illustrated in FIG. 5. An attachment 27 in FIG. 5 allows the charger 23 in FIG. 1 to charge the battery packs 121-123 in FIG. 6, and allows the power supply to the communication equipment body 21 in FIG. 1 from the battery packs 121-123 in FIG. 6.

The attachment 27 have pairs of transistors 2731, 2732 and 2733 connected to the resistors 2531, 2532 and 2533, respectively. The transistor pairs 2731, 2732 and 2733 detect voltage drops if occurred across the resistors 2531, 2532 and 2533, respectively. The transistor pair 2731 comprises N channel MOS transistors 2731A and 2731B, the transistor pair 2732 comprises N channel MOS transistors 2732A and 2732B, and the transistor pair 2733 comprises N channel MOS transistors 2733A and 2733B.

When a voltage drop occurs across any of the resistors 2531, 2532 and 2533, one of the transistors in the associated transistor pair 2731, 2732 or 2733 is turned on in accordance with the polarity of the voltage drop.

With the voltage applied to the terminal TR, a regulator 2771 produces a given reference voltage and applies it to the resistor 2521, 2522 or 2523 via the turned-on transistor 2751, 2752 or 2753.

When the attachment 27 is connected between the battery pack 121 (FIG. 6) and the socket of the charger 23, for example, the terminals TD1, TD2, TD3 and TE of the battery pack 121 are respectively connected to the terminals TP1, TP2, TP3 and TQ of the attachment 27, and the terminals TM, TO and TN of the charger 23 are respectively connected to the terminals TR, TS and TT of the attachment 27.

A current flows into the battery A1 via the terminals TM and TR, causing a voltage drop across the resistor 2531. This turns on the transistor 2731B, turning on the transistor 2751. As a result, the output voltage of the regulator 2771 is divided by the resistor 2521 and monitor resistor 232, and the resultant voltage is applied to the monitor voltage detector 233. The charger 23 can therefore supply the appropriate charge voltage to the battery pack 121.

The same operation takes place when the attachment 27 is connected between the battery pack 122 or 123 and the socket of the charger 23, for example.

When the attachment 27 is connected between the battery pack 122 (FIG. 6) and the communication equipment body 21 (FIG. 1), for example, the terminals TD1, TD2, TD3 and TE of the battery pack 122 are respectively connected to the terminals TP1, TP2, TP3 and TQ of the attachment 27, and the terminals TF, TL and TG of the communication equipment body 21 are respectively connected to the terminals TR, TS and TT of the attachment 27.

A current flows into the communication circuit 211 and the regulator 213 via the terminals TD2 and TP2, the resistor 2532 and the terminals TR and TF from the battery A2 in the battery pack 122, causing a voltage drop across the resistor 2532. As a result, the transistor 2732A is turned on, turning on the transistor 2752. Therefore, the output voltage of the regulator 2771 is divided by the resistors 2522 and 214, and the resultant voltage is supplied to the A/D converter 215 where it is converted into a digital value. The CPU 212 compares the digital value with the reference values stored in the memory 216, discriminates that the attached battery pack is the battery pack 122, and causes the switch controller 219 to switch the operation mode of the communication circuit 211 to the one corresponding to the battery pack 122.

The structure of the attachment 27 is not limited to what is shown in FIG. 5.

For example, the transistors 2731A to 2733B of the attachment 27 may be replaced with P channel MOS transistors, bipolar transistors and other switch circuits. Likewise, the transistors 2751-2753 may be replaced with other switch circuits. The transistors 751-2753 may be omitted and three regulators may be provided instead as in the attachment 27. Further, the attachment 27 may take another structure as long as it can detect the flow of a current through any one of the terminals TR, TP1, TP2 and TP3. For example, the voltage drop across the individual resistors 253-2533 may be absolute-amplified, so that the transistors 2751-2753 are turned on or off by the absolutely amplified signals.

The charger 23, attachment 27, battery pack 121, 122 or 123 and communication equipment body 11 may be connected together so that the communication apparatus body 11 is operable while the charge power is supplied via the attachment 27 to the battery pack 121, 122 or 123 from the charger 23.

Although the battery pack 22 is provided with the power supply terminals TB, TJ and TC and the charge terminals TD, TK and TE in the above-described embodiment, the terminals TB, TJ and TC may also be used for the power supplying purpose. In this case, the regulator 223 and the resistor 225 can be eliminated.

There are many regulators which have different output voltages. If regulators with different output voltages are used for the different specifications of the batteries and the outputs of the regulators are used directly as specification-discriminating voltages, therefore, the specification-discriminating resistors 214, 224, 225, 232, 244, and 2521 to 2523 can be omitted, thus reducing the required components.

Although the foregoing description of the embodiment has been given with reference to the case where the battery in each battery pack is a rechargeable type, this embodiment is also applicable to a battery pack containing a non-rechargeable battery except that charging is disabled.

The this invention is not limited to the above-described embodiment, but may be modified in various other forms without departing from the scope or spirit of the invention.

What is claimed is:

1. An electronic device having terminals connected to those of any of a plurality of battery packs of different specifications when selectively attached to a main body of said electronic device, thereby allowing output of a battery incorporated in the attached battery pack as a supply voltage to said main body of said electronic device, and switching of an operation mode in accordance with a type of the attached battery pack, said electronic device (21) and each of the battery packs (22) having specification-discriminating terminals (TL, TJ) which are connected when said electronic device and the battery pack are connected together;

each of said battery packs (22) having a regulator (222) for generating a regulated voltage from an output voltage of the incorporated battery (221) and a first monitor resistor (224) connected between an output terminal of said regulator (222) and said specification-discriminating terminal (TJ) thereof and having a resistance corresponding to said specification of said incorporated battery (221); and said main body (21) having a second monitor resistor (214) connected between said specification-discriminating terminal (TL) thereof and ground, the output voltage of the regulator (222) in said battery pack (22) being divided by the first and Second monitor resistors (214, 224), monitor voltage detecting means (215) for detecting a monitor voltage generated across said second monitor resistor (214), specification discriminating means (212, 216) for discriminating said specification of said incorporated battery of said attached battery pack (22) from said monitor voltage detected by said monitor voltage detecting means (215), and operation mode switching means (212, 219) for switching said operation mode in accordance with said specification discriminated by said specification discriminating means (212, 216).

2. The electronic device according to claim 1, wherein the regulated voltage does not provide the supply voltage to said main body.

3. The electronic device according to claim 1, wherein the regulator outputs substantially zero volts when the output of the voltage of the battery becomes substantially lower than the rated voltage of the battery.

4. The electronic device according to claim 1, wherein the regulator provides an output voltage that sharply drops when the output voltage of the battery (221) falls below a rated voltage by a predetermined ratio.

5. The electronic device according to claim 1, wherein each of said battery packs has a power supply terminal (TB) to which an output voltage of said incorporated battery (221) is directly supplied, and said main body have a power terminal (TF) which is connected to the power supply terminal of the attached battery pack.

6. An electronic device having terminals connected to those of any of a plurality of battery packs of different specifications when selectively attached to a main body of said electronic device, thereby allowing output of a battery incorporated in said attached battery pack as a supply voltage to said main body of said electronic device, and switching of an operation mode in accordance with a type of said attached battery pack, said electronic device, (21) and each of said battery packs (22) having specification-discriminating terminals (TL, TJ) which are connected when said electronic device and battery pack are connected together;

each of said battery packs (22) having specification-discriminating voltage generating means (222, 224) for generating a specification-discriminating voltage indicating said specification of said incorporated battery (221) from an output voltage of salad incorporated battery, and outputting said specification-discriminating voltage to said specification-discriminating terminal (TJ) thereof; and said main body (21) having a monitor resistor (214) connected between said specification-discriminating terminal (TL) thereof and ground, monitor voltage detecting means (215) for detecting a monitor voltage generated across said monitor resistor (214), specification discriminating means (212, 216) for discriminating said specification of said incorporated battery of said attached battery pack (22) from said monitor voltage detected by said monitor voltage detecting means (215), and operation mode switching means (212, 219) for switching said operation mode in accordance with said specification discriminated by said specification discriminating means (212, 216);

wherein said main body (21) is connectable to an external power supply when an external power supply pack (24) is connected to said main body (21);

said external power supply pack (24) has a specification-discriminating terminal (TJ) to be connected to said specification-discriminating terminal (TL) of said main body (21) when attached to said main body (21), and specification-discriminating voltage generating means (243, 244) for producing a specification-discriminating voltage instructing the external power supply pack from an output of said external power supply pack (24) and sending said specification-discriminating voltage to said specification-discriminating terminal (TJ) thereof; and said specification discriminating means of said main body (21) has means (212, 216) for discriminating from said monitor voltage that said external power supply pack is attached.

7. The electronic device according to claim 6, wherein said main body (21) has a display portion (217, 218) for indicating operational contents, an illumination light (21B) for illuminating a display screen of said display portion (217, 218), and an illumination light driver (21A) for turning on said illumination light (21B) when said specification discriminating means (212, 216) discriminates that said external power supply pack (24) is attached.

8. A battery pack for use as a power supply for an electronic device capable of switching an operation mode in accordance with a connected power supply, said battery pack incorporating a battery according to a specification of said battery pack and terminals connected to those of said electronic device when selectively attached to a main body of said electronic device, thereby supply a battery output to said main body via said terminals, said battery pack comprising:

a regulator (222) for producing a regulated voltage from an output voltage of said incorporated battery (221);

a first monitor resistor (224) connected at one end to an output terminal of said regulator (222);

said specification-discriminating terminal (TJ) thereof and having a resistance corresponding to said specification of said incorporated battery (221); and a specification-discriminating terminal (TJ) connected to another end of said first monitor resistor (224) and a specification-discriminating terminal (TL) of said main body (21), wherein when attached to said main body (21), said battery pack (24) generates a specification-discriminating monitor voltage across a second monitor resistor (214) connected between said specification-discriminating terminal (TL) of said main body (21) and ground.

9. The battery pack according to claim 8, wherein the battery pack supplies the output voltage of the battery directly to said main body as a power source.

10. The battery pack according to claim 8, wherein the regulator outputs substantially zero volts when the output of the voltage of the battery becomes substantially lower than a rated voltage of the battery.

11. The battery pack according to claim 8, wherein the regulator is a type whose output voltage sharply drops when the output voltage of the battery (221) falls below a rated voltage by a predetermined ratio.

12. The battery pack according to claim 8, wherein each of said battery packs has a power supply terminal (TB) to which the output voltage of said incorporated battery (221) is directly supplied, and said main body has a power terminal (TF) which is connected to the power supply terminal of the attached battery pack.

13. An electronic apparatus, comprising:

a battery pack for storing a stored battery of a predetermined specification, the battery pack having first terminals, including a power supply terminal for connection to an electronic device and a first specification-discriminating terminal;

means for providing power from the stored battery to the electronic device through the power supply terminal;

a regulator for generating a regulated voltage from an output voltage of the stored battery, and a first monitor resistor connected between an output terminal of said regulator and said first specification-discriminating terminal, and having a resistance corresponding to the specification of the stored battery; and a main body having second terminals selectively connectable to said first terminals of said battery pack, operable with power from a supply voltage from the stored battery, in one of a plurality of operation modes corresponding to the specification of the stored battery, when the second terminals are connected to the first terminals of the battery pack containing the stored battery, the second terminals including a second specification-discriminating terminal, selectively connectable to said a first specification-discriminating terminal, the main body further including a second monitor resistor connected between said second specification-discriminating terminal and a ground, so that when said second specification-discriminating terminal is connected to said first specification-discriminating terminal, the regulated voltage of said regulator is divided by said first and second monitor resistors, monitor voltage detecting means for detecting a monitor voltage generated across said second monitor resistor, specification discriminating means for discriminating the specification of the stored battery based on the monitor voltage detected by said monitor voltage detecting means, and operation mode switching means for switching the operation mode in accordance with the specification discriminated by said specification discriminating means.

14. The electronic apparatus according to claim 13, wherein the power supplying means provides a supply voltage to said main body, wherein the regulated voltage does not provide the supply voltage.

15. The electronic apparatus according to claim 13, wherein the regulator outputs substantially zero volts when the output voltage of the stored battery becomes substantially lower than a rated voltage of the battery.

16. The electronic apparatus according to claim 13, wherein the regulator provides an output voltage that sharply drops when the output voltage of the stored battery falls below a rated voltage by a predetermined ratio.

17. The electronic apparatus according to claim 13, wherein the power supply terminal is directly supplied an output voltage of the stored battery, and said second terminals include a power supply terminal which is connected to the power supply terminal of the battery pack.

18. An electronic apparatus, comprising:

a battery pack for storing a stored battery of a predetermined specification, the battery pack having first terminals, including a power supply terminal for connection to an electronic device, and a specification-discriminating terminal;

means for providing power from the stored battery to the electronic device through the power supply terminal, and specification-discriminating voltage generating means for generating a specification-discriminating voltage indicating the specification of the stored battery, from an output voltage of the stored battery, and outputting the specification-discriminating voltage to said first specification-discriminating terminal; and a main body having second terminals selectively connectable to said first terminals of said battery pack, operable with power from a supply voltage from the stored battery, in one of a plurality of operation modes corresponding to the specification of the stored battery, when the second terminals are connected to the first terminals of the battery pack containing the stored battery, the second terminals including a second specification-discriminating terminal, selectively connectable to said first specification-discriminating terminal, the main body further including a monitor resistor connected between said second specification-discriminating terminal and a ground, monitor voltage detecting means for detecting a monitor voltage generated across said monitor resistor when said second specification-discriminating terminal is connected to said first specification-discriminating terminal, specification discriminating means for discriminating the specification of the stored battery based on the monitor voltage detected by said monitor voltage detecting means, and operation mode switching means for switching the operation mode in accordance with the specification discriminated by said specification discriminating means;

wherein the power supply pack is an external power supply pack and wherein said main body is connectable to an external power supply when the external power supply pack is connected to the main body, said specification-discriminating generating means of said external power supply pack having means for producing a specification-discriminating voltage that instructs the external power supply pack from outside of said external power supply pack and sends the specification-discriminating voltage to said first specification-discriminating terminal, said specification discriminating means having means for discriminating from said monitor voltage that said external power supply pack is connected.

19. A battery pack for storing a stored battery of a predetermined specification, comprising:

first terminals, including power supply terminals for connection to an electronic device and a specification-discriminating terminal;

means for providing power from the stored battery to the electronic device through the power supply terminals;

a regulator for generating a regulated voltage from an output voltage of the stored battery; and a first monitor resistor connected between an output terminal of said regulator and said first specification-discriminating terminal, and having a resistance corresponding to the specification of the stored battery.

20. The battery pack according to claim 19, wherein the battery pack supplies the output voltage of the stored battery directly to said main body as a power source.

21. The battery pack according to claim 19, wherein the regulator outputs substantially zero volts when the output voltage of the stored battery becomes substantially lower than a rated voltage of the battery.

22. The battery pack according to claim 19, wherein the regulator supplies an output voltage that sharply drops when the output voltage of the stored battery falls below a rated voltage by a predetermined ratio.

23. The battery pack according to claim 19, wherein the power supply terminals include a power supply terminal to which an output voltage of the stored battery is directly supplied, for connection to a power terminal (TF) of a main body of an electronic device.

* * * * *